United States Patent [19]

Kunze

[11] Patent Number: 4,945,431
[45] Date of Patent: Jul. 31, 1990

[54] MAGNETIC TAPE CASSETTE DEVICE TO LIMIT MOVEMENT OF THE CASSETTE

[75] Inventor: Norbert Kunze, Ehringshausen, Fed. Rep. of Germany

[73] Assignee: U.S. Philips Corporation, New York, N.Y.

[21] Appl. No.: 194,764

[22] Filed: May 17, 1988

[30] Foreign Application Priority Data

May 25, 1987 [DE] Fed. Rep. of Germany ....... 3717587
May 25, 1987 [DE] Fed. Rep. of Germany ....... 3717599

[51] Int. Cl.$^5$ .............................................. G11B 15/00
[52] U.S. Cl. ..................................... 360/96.5; 242/198
[58] Field of Search ................ 360/96.5; 242/197–201

[56] References Cited

U.S. PATENT DOCUMENTS 3,996,618 12/1976 Suzuki .............................. 360/93 X
4,775,904 10/1988 Kimura ........................... 360/96.5 X Primary Examiner—A. J. Heinz
Attorney, Agent, or Firm—Brian Wieghaus

[57] ABSTRACT

The invention relates to a magnetic tape cassette device in which a cassette (2) containing the magnetic tape can be introduced into a cassette tray and can rest, loosely held, in the cassette tray (1) before or after the moving of an operating lever (13) which can move with the cassette housing during introduction, the operating lever (13) interacting with a tappet (29), which in the introduction position of the cassette pushes against the latter in order that it may be hindered from free movements in the cassette tray (1). The tappet lever (23) is designed as a double-armed swivel part (23), the tappet (29) being provided at a free end (28) of a first swivel arm (24) of the swivel part (23) and the connection to the operating lever (13) being provided at the end of a second swivel arm (25) of this swivel part (23). The connection with the operating lever is either direct or via an over-center helper spring (125), which moves the operating lever (13) automatically into an end position in each case after passing beyond the top dead center.

17 Claims, 4 Drawing Sheets

MAGNETIC TAPE CASSETTE DEVICE TO LIMIT MOVEMENT OF THE CASSETTE

BACKGROUND OF THE INVENTION

The invention relates to a magnetic tape cassette device in which a cassette containing the magnetic tape can be introduced into a cassette tray and can rest, loosely held, in the cassette tray before or after a moving of an operating lever which can move with the cassette housing. During the introduction or insertion, the operating lever interacting with a tappet, which in the introduction position of the cassette pushes against the latter.

Such a magnetic tape cassette device is known from U.S. Pat. No. 4,623,945. The tape drive of such a magnetic tape device has a cassette tray into which the cassette is manually pushed. In the cassette tray, the cassette can rest, loosely held, without tape drive functions being initiated or once tape drive functions at the end of a playing operation have returned the cassette back to the loosely held position. In this loosely held position, the cassette rests in the cassette tray with so much play that it moves when the device is jolted and consequently may rattle in the tray. Particularly when such a magnetic tape cassette device is fitted in a motor vehicle, such jolts on the device arise and rattling effects occur, which are disagreeable for the vehicle passengers.

It is known per se in the case of magnetic tape cassette devices to counter the rattling by means of a tappet which pushes laterally against a cassette wall and suppresses movement of the cassette leading to rattling. This tappet is spring-loaded and is connected via a connecting rod to a lift or operating lever, which transfers cassette movements to the tape drive in order to shift the lift lever with the cassette, for example, into a playing position. Conversely, the lift lever may also convert lift movements into pushing-out movements of the cassette tray as part of the eject movement. This known design consists of a series of individual parts, including a spring, and is thus complex.

SUMMARY OF THE INVENTION

It is the object of the invention to create a magnetic tape cassette device in which the rattling of a magnetic tape cassette in the tray of a magnetic tape device is prevented with a few simple components.

The set object is achieved by a first solution according to the invention in that the tappet is arranged on a tappet lever, which is in positive connection, or directly coupled, with the operating lever, the tappet being provided with a runup slope which, during advancement of the tappet against the cassette pushes with the run-up slope positively against at least the main wall of the cassette housing and pushes the cassette housing with the main wall against a tray wall.

Since the tappet is arranged directly on a tappet lever positively connected to the operating lever, the tappet itself does not require any spring bias specifically only for itself. The tappet lever provides for the movement of the tappet directly via the operating lever.

According to a further development of the invention it is provided that the tappet engages in an opening of the cassette and the run-up slope is pushed from the inside against the main wall. If the tappet engages into an opening of the cassette, it can raise the cassette with its run-up slope and push it against a tray wall. This creates a very effective measure for the prevention of rattling noises.

According to a further development of the invention, it is provided that the tappet lever is designed as a double-armed swivel or pivotable, part, the tappet being provided at a free end of a first arm of the swivel part and the positive connection to the operating lever being provided at the free end of a second arm of this swivel, or pivotable part. The tappet lever is consequently of the simplest possible design, in that it is practically only a swivelling part which is swivelled by the operating lever.

According to a further development of the invention, the transmission of movement is achieved in a simple way by the direct coupling being formed from a guide pin on the second arm end and a bracket, guiding the guide pin, in the operating lever. At the same time, according to a further development of the invention, it is provided that the swivel part is capable of swivelling about its center between the swivel arms.

In the case of the magnetic tape cassette device according to the previously mentioned U.S. Pat. No. 4,623,945, an over-center helper spring acts on the operating lever, which spring moves the operating lever automatically into a load position of an eject position in each case after passing beyond the top dead center.

The previously set object is achieved by a second solution according to the invention in that the tappet is arranged on a tappet lever which is in positive connection with the operating lever via the over-center helper spring. The over-center helper spring, which during automatic swivelling of the operating lever accompanies the swivel movement by executing the same opposite movement, has at its supporting end remote from the point of contact with the operating lever an extension, or free end, which acts on the tappet lever.

The movement of the over-center helper spring, which is in any case present as a component in the tape drive of the device, is thus utilized to push the tappet against the magnetic tape cassette when the latter is in the rest or introduction position and thereby impedes the cassette from free movement in the cassette tray. Consequently, all that is needed to block the movement of the magnetic tape cassette in its rest position in the cassette tray is a single additional component and a mounting provided for it.

According to a further development of the invention, it is provided that the tappet is designed as a fork, which acts with sloping run-up surfaces over the edges of two main walls of the housing. By gripping over with the fork, the cassette is securely held at the contact edge and pushed against the opposite wall of the cassette tray. This produces a very powerful clamping effect.

According to a further development of the invention, it is provided that the extension, or free end, engages in a resilient lug of the swivel part. The resilient lug has the effect of bringing about a tolerance compensation, so that no jamming can occur during the movement.

If the tappet lever is designed in accordance with a further development of the invention as a swivel part, with a suitable selection of material, the resilient lug can be set in the plastics injection moulding.

BRIEF DESCRIPTION OF THE DRAWINGS

The invention will be explained in more detail with reference to the drawing, in which.

DESCRIPTION OF THE PREFERRED EMBODIMENTS

Figure 1:
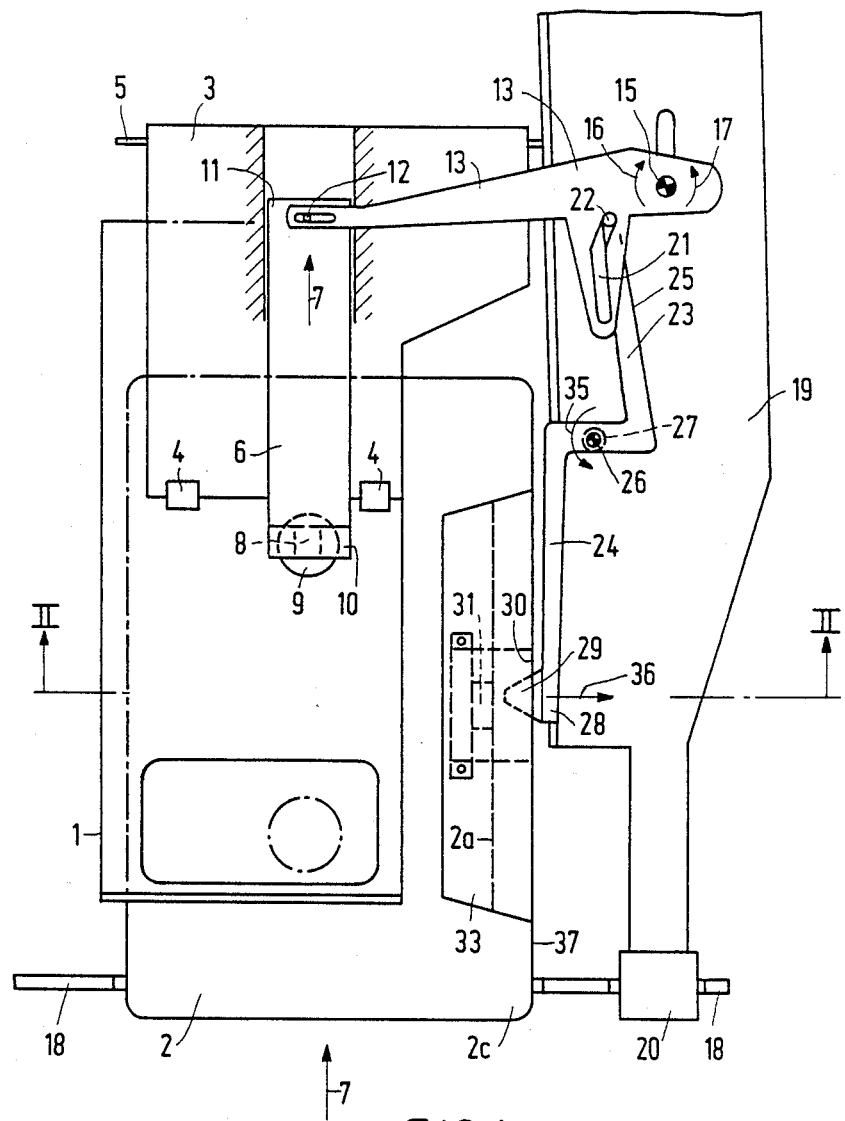
FIG. 1 shows, in plan view, a cut-out section of a tape drive of a magnetic tape cassette device according to a first exemplary embodiment, having a loaded cassette and having a part of the lift mechanism for shifting the cassette into an operating position or out of this position.

FIG. 1 shows a cutout section from the tape drive of a magnetic tape cassette device having a cassette tray 1, into which a compact cassette 2 is loaded. The cassette tray 1 can be lowered vertically with respect to the plane of the drawing with the aid of a lift flap 3, which acts pivotably via lugs 4 of the cassette tray 1 on the cassette tray 1. The lift flap can swivel about an axis 5.

In the lift flap 3, a catch slide 6 is displaceably guided in the direction of an arrow 7 indicating the direction of insertion. The catch slide 6 has a catch 8, which can engage in a hole 9 of the housing of a cassette, under which hole one of the hubs of the magnetic tape cassette 2 (not shown) can be reached. At the control end 11 of the catch slide 6 lying opposite the catch end 10, a lift or the operating lever 13, which can swivel spring-loaded in two opposite directions by means of an over-center helper spring (not shown), acts via a slot-pin connection 12. The lift lever 13 is rotatably mounted on the chassis plate 14 of the tape drive indicated in FIG. 2. The axis of rotation is specified by 15. The swivelling of the lift lever 13 from the eject position shown in FIG. 1 to a load position, not shown, has the effect of lowering the cassette tray 1 in a way not shown when the lift lever 40 swivels in the direction of an arrow 16 due to a deep pushing in or drawing in of the magnetic tape cassette 2. Conversely, the lift lever 13 can, when it is swivelled anti-clockwise in the direction of an arrow 17, after completion of playing operation, shift the magnetic tape cassette 2 via the catch slide 6, after raising of the cassette tray 1 into the position which can be seen in FIG. 1. This position of the cassette shown in FIG. 1 is a so-called rest or introduction position, in which the magnetic tape cassette 2 projects from a front wall 18 of the device to such an extent that the magnetic tape cassette 2 can be grasped by hand and pulled out. Also during the insertion of the magnetic tape cassette 2 by hand, the cassette first clicks perceptibly in the introduction position shown in FIG. 1, namely because the catch 8 drops into the hole 9 of the cassette housing. This dropping can be clearly recognized in FIG. 2.

Associated with the tape drive is a control rod 19 which is likewise adjustable in the direction of the arrow 7. For adjustment, the control rod 19 is provided with an operating knob 20 which projects from the front wall 18 of the device. The movement function of the control rod 19 is explained in U.S. Pat. No. 4,623,945 (incorporated by reference).

The lift lever 13 is provided with a bracket 21, in which a guide pin 22 of a tappet lever 23 engages. The tappet lever 23 is a double-armed lever with a first swivel arm 24 and a second swivel arm 25. The tappet lever 23 is capable of swivelling at its center about an axis 26. For this purpose, a bearing pin 27 is fixed in the control rod 19.

The free end 28 of the first swivel arm 24 bears a tappet 29, which can move into an opening 30 of the cassette housing.

FIG. 1 shows an opposing position of lift lever 13 and tappet lever 23, in which the lift lever 13 has, via the tappet lever 23, pushed the tappet 29 into the opening 30 of the front wall 37 of the cassette housing. The tappet 29 is preferably located in front of the pressure part 31 of the cassette 2.

Figure 2:
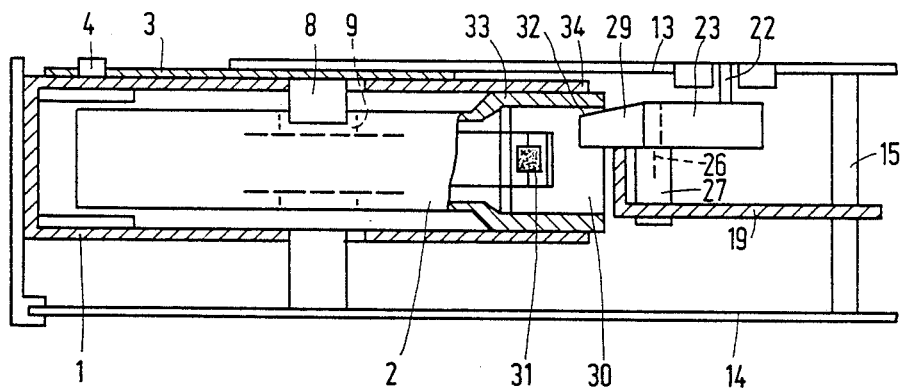
FIG. 2 shows a section through the tape drive along the line II—II according to FIG. 1.

This push-in position of the tappet 29 can be seen in FIG. 2. The representation according to FIG. 2 also shows that the tappet 29 is provided with a run-up slope 32, with which the tappet 29 presses during its entry into the opening 30 against a main housing wall 33 of the cassette housing. This leads to the wall 33 for its part pushing against a wall 34 of the cassette tray 1 and the cassette thus no longer has any free play which could cause rattling.

If the cassette 2 is pushed in further, for example by hand, out of the rest position according to FIG. 1, the catch slide 6 swivels the lift lever 13 in the direction of the arrow 16. This has the consequence that the guide pin 22 is taken along clockwise in the bracket 21 and swivels the tappet lever 23 in the direction of an arrow 35. The tappet 29 thereby lifts out of the opening 30 in the direction of an arrow 36 and the clamping of the cassette is released. The cassette 2 can thus be introduced further, unhindered by the tappet 29.

Figure 3:
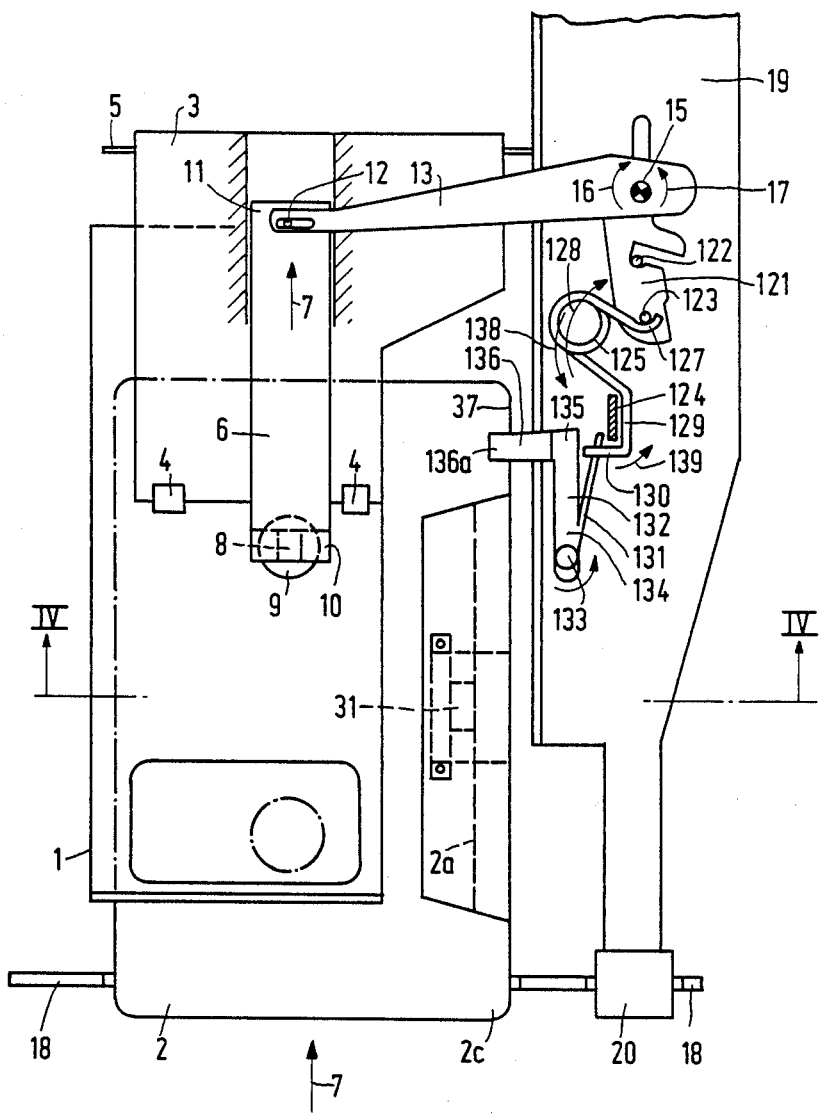
FIG. 3 shows a plan view of a part of a tape drive of a magnetic tape cassette device according to a second exemplary embodiment, having a tappet acting on a cassette to stop it rattling.
Figure 4:
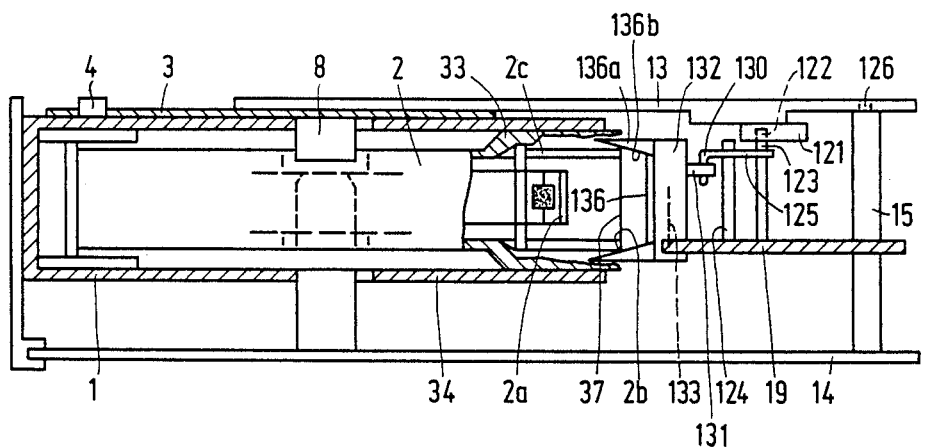
FIG. 4 shows a section through the tape drive along the line IV—IV according to FIG. 3.

In the second exemplary embodiment of the magnetic tape cassette device according to FIGS. 3 and 4, the lift lever 13 is provided with an adjoint piece 121, in which a guide pin 122 of the control rod 19 engages. The adjoint piece 121 also has a counter bearing 123. A tab 124 is bent off upwards from the control rod. The counter bearing 123 and the tab 124 form supports for an over-center helper spring 125. The over-center helper spring 125 is active in both directions of movement of the lift lever 13. If the lift lever 13 goes beyond the top dead center with its position, the over-center helper spring 125 automatically pushes the lift lever 13 further in the direction of movement 16 or 17 just taken, into the load position or the eject position. In so doing, the over-center helper spring 125 executes a swivelling movement which runs opposite to the swivel movement of the lift lever 13. This is due to the fact that the counter bearing 123 swivels about the bearing 126 of the lift lever 13 and the end 127 of the over-center helper spring 125 acting on the counter bearing 123 makes this end 127 describe an arc about the bearing 126. The movement of the over-center helper spring 125 is indicated by the bent arrow 138. A detailed description of the functional principle is included in the said U.S. Pat. No. 4,623,945.

The end 129 of the over-center helper spring 125 resting against the support 124 is provided with an extension, or free end, 130, which engages through a resilient lug 131 of a lever 132 designed as a swivel part. The swivel part 132 is a plastics injection moulding which is rotatable about an axis 133. The bearing is located in an end 134 of the swivel part 132. The resilient lug 131 protrudes from this end 134. At an end 135 of the swivel part 132 opposite the axis 133, there is a fork-shaped tappet 136. Fork prongs 136a of the tappet 136 have sloping run-up edges 136b. The sloping run-up edges 136b engage over and clamp the edges 2b of the main cassette walls 2c, which are held apart by the front wall 37. In FIG. 4, the clamping engagement of the tappet 136 can be clearly seen.

If the magnetic tape cassette 2 is pushed deeper into the cassette tray and consequently the lift lever 13 swivels in the direction of the arrow 16, the over-center helper spring 125 tilts in the direction of an arrow 138 which has the consequence that the extension 130 swivels in the direction of an arrow 139. The extension 130 then takes the swivel part 132 with it clockwise and lifts the tappet 136 off the wall 37 of the magnetic tape cassette 2 so that the way for lowering is free.

If, at the end of a playing operation, the lift lever 13 is swivelled anti-clockwise in the direction of the arrow 17 by operation of the knob 20, the over-center helper spring 125 swivels in the direction of the arrow 128 and the extension, or free end, 130 pushes the tappet 136 against the edges 2b of the housing of the magnetic tape cassette. In this way, the magnetic tape cassette 2 is pushed back in the direction of the rest position according to FIG. 1 retarded by friction between the run-up edges 136b of the fork prongs 136a and the edges 2b of the cassette housing and locked in the rest position by the catch 8. Rattling noises of the magnetic tape cassette 2 in the cassette tray 1 are then also suppressed.

What is claimed is:

1. A magnetic tape cassette device, comprising:
   a cassette tray for receiving a magnetic tape cassette with a clearance fit;
   means for mounting said tray for movement between a rest position in which a cassette can be inserted in said tray and a play position;
   a pivotable operating lever coupled to say tray, said operating lever pivoting during movement of said tray between said rest and play positions;
   a tappet lever having a tappet end and an opposing end, said tappet lever being mounted for movement of said tappet end against a cassette received in said tray, said tappet end having a sloped surface angled with respect to a wall of said cassette; and
   coupling means for directly coupling said opposing end of said tappet lever to said operating lever for biasing said sloped surface against a cassette wall and urging the cassette against said tray when said tray is in said rest position and for withdrawing said tappet from said cassette when say tray is moved from said rest position.

2. A magnetic tape cassette device according to claim 1, characterized in that said coupling means comprises a guide pin at the opposing end of said tappet lever and a bracket on the operating lever.

3. A magnetic tape cassette device as claimed in claim 1, wherein the cassette has a pair of opposing major walls each with an inner surface and a side wall with an opening between said major walls, and said tappet lever being mounted such that said tappet protrudes into said opening in the insertion position of said tray with said sloped surface engaging said inner surface of one of said major cassette walls for biasing said major cassette wall against said tray.

4. A magnetic tape cassette device according to claim 3, characterized in that said coupling means comprises a guide pin at said opposing end of said tappet lever and a bracket, on the operating lever.

5. A magnetic tape cassette device according to claim 4, characterized in that the tappet lever is pivotable about its center between the tappet end and opposing end.

6. A magnetic tape cassette apparatus as claimed in 3, wherein said tappet lever is pivotable about a pivot and comprises first and second pivot arms each with a free end, said tappet end being at said free end of said first arm and said coupling means being provided at said free end of said second arm.

7. A magnetic tape cassette device according to claim 6, characterized in that said coupling means comprises a guide pin on the second arm end and a bracket on the operating lever.

8. A magnetic tape cassette device according to claim 7 characterized in that the tappet lever is pivotable about its center between the first and second arms.

9. A magnetic tape cassette apparatus as claimed in 1, wherein said tappet lever is pivotable about a pivot and comprises first and second pivot arms each with a free end, said tappet end being at said free end of said first arm and said coupling means being provided at said free end of said second arm.

10. A magnetic tape cassette device according to claim 9, characterized in that said coupling means comprises a guide pin on the second arm end and a bracket on the operating lever.

11. A magnetic tape cassette device according to claim 10, characterized in that the tappet lever is pivotable about its center between the first and second arms.

12. A magnetic tape cassette device, comprising:
   a cassette tray for receiving a magnetic tape cassette with a clearance fit;
   means for mounting said tray for movement between a rest position in which a cassette can be inserted in said tray and a play position, said tray having a center position between said rest and said play positions;
   a pivotable operating lever coupled to said tray, said operating lever pivoting during movement of said tray between said rest and play positions;
   an over center spring connected to said operating lever for automatically moving said tray into said play position when said tray is moved in the direction of said play position past said center position and for moving said tray into said rest position when said tray is moved by said operating lever from said play position in the direction of said rest position past said center position;
   a tappet lever having a tappet end and an opposing end; and
   said over center spring having a free end remote from said operating lever connected to said tappet lever which free end pivots during pivoting of said operating lever for biasing said tappet end against a wall of a cassette resting in said tray when said tray is in said rest position and for withdrawing said tappet from said cassette when said tray is moved out of said rest position.

13. A magnetic tape cassette device according to claim 12, characterized in that the tappet lever is pivotable about a pivot and is a plastics injection moulding.

14. A magnetic tape cassette device according to claim 15, characterized in that the tappet lever is pivotable about a pivot and is a plastics injection moulding.

15. A magnetic tape cassette device according to claim 12, characterized in that said cassette has two major parallel side walls terminating at respective edges, and said tappet is designed as a fork having opposing sloping run-up surfaces which engage over said edges of said two main walls of the cassette.

16. A magnetic tape cassette device according to claim 12, characterized in that said tappet lever has a resilient lug and said free end of the over-center helper spring engages in said resilient lug of the tappet lever.

17. A magnetic tape cassette device according to claim 16, characterized in that the tappet lever is pivotable about a pivot and is a plastics injection moulding.

* * * * *